3,427,079
TWO-PIECE MASTER TRACK LINK
Austin G. Skromme, Peoria, Ill., and James N. Maytum, Brookings, S. Dak., assignors to Caterpillar Tractor Co., Peoria, Ill., a corporation of California
Filed June 9, 1967, Ser. No. 645,055
U.S. Cl. 305—58                             4 Claims
Int. Cl. B62d 55/20; F16g 13/06

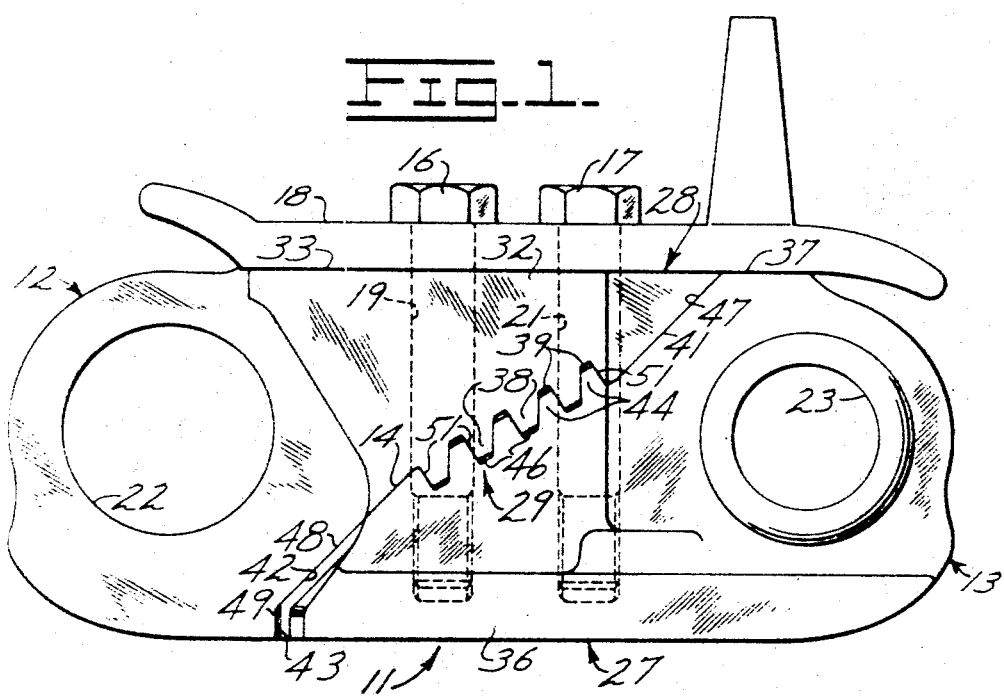
Fig. 1.
Fig. 2.
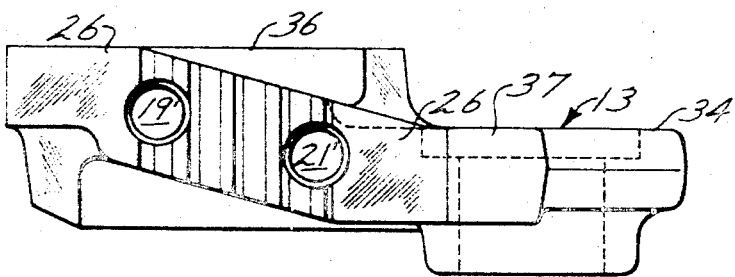
Fig. 3.
INVENTORS
AUSTIN G. SKROMME
JAMES N. MAYTUM
BY
Fryer, Tjensvold, Feix, Phillips + Lempio
ATTORNEYS

United States Patent Office 3,427,079
Patented Feb. 11, 1969

ABSTRACT OF THE DISCLOSURE

A two-piece master track link. A central portion of the juncture between the parts is disposed on a diagonal plane of the link with multiple interlocking serrations being defined on the mating surfaces of the parts along the diagonally disposed juncture. The ends of the juncture line vary out of the diagonal plane to provide increased link part masses between pin connections of the parts and the juncture of the parts.

Background of the invention

This invention relates to master links of the type used in chains, track-type tractor tracks and other articulated devices of a similar nature. The invention is particularly adaptable for use with the articulated endless track of a crawler-type vehicle, but while it is described by reference to such use, its adaptability to other similar uses will be apparent from the following description.

An endless track for crawler-type vehicles comprises a plurality of track shoes carried by links which are pivotally connected by means of pins. It is conventional to provide a master pin or a master link in each continuous chain of links which may be retained securely in place while still permitting separation of the link chain for disassembly of the endless track from the vehicle. Master link connections commonly comprise two link parts, each adapted to receive a pin and each having a mating surface to interlock with the mating surface of the other link part. The mating surfaces of the link parts each have an interlocking contact surface, these surfaces coacting to resist tensile force exerted on the link at the pin connections of each part. Suitable means such as screws maintain the link parts in their mating interlocked relation while they are disposed within an endless track.

It has been found desirable to improve the prior art master links such as described above for numerous reasons. For example, it is desirable to distribute the tensile load exerted upon the master link more broadly across the mating surfaces of the link parts to prevent localized stress therein. It is also desirable to provide master link parts which are more easily machined and which facilitate assembly and disassembly of the master link particularly in large vehicles having heavy endless tracks and which vehicles are to be repaired in the field. It is further desirable to provide master link parts which have longer thread lengths for engaging the cap screws to reduce thread fatigue and failure. It is still further desirable to provide track link parts which permit the use of heavier cap screws and which have a greater mass between their mating surfaces and their pin bearing surfaces to reduce the unit stresses in the cap screws and the link parts and permit longer operating life.

Summary of the invention

The present invention provides a two-piece master track link which has the desired advantages noted above.

Two separable link parts each have a pin connection portion respectively at opposite ends of the link and a central portion with a mating surface to form a juncture between the parts.

The juncture between the mating surfaces of the link parts is disposed at least in substantial part on a diagonal plane between the inner and outer link surfaces, the mating surfaces of the parts which form the juncture portion on the diagonal plane each having multiple mating interlocking serrations arranged generally parallel with the pins to be received by the link parts.

Brief description of the drawings

FIG. 1 is a side elevation of a master track link connected to a track shoe and embodying the present invention;

FIG. 2 is a bottom plan view of the outer master link part (shoe side) of FIG. 1; and FIG. 3 is a top plan view of the inner master link part (rail side) of FIG. 1.

Description of the preferred embodiment

Referring now to FIG. 1, the master track link of the present invention is indicated at 11 and comprises two overlapping master link parts 12 and 13 which mate and interlock along a juncture line 14. A pair of long cap screws 16 and 17 pass inwardly through a track shoe 18, a pair of bores 19 and 21 respectively in the outer master link part 12 and threadedly engage the inner master link part 13. As is typical in the prior art, one of the master link parts, for example, the outer link part 12 of FIG. 1, defines a pin bushing connection bore 22 to receive the bushing of a track pin (not shown) while the other link part, for example, the inner link part 13 of FIG. 1, defines a pin connection bore 23 to receive and retain another track pin by means of, for example, a press fit.

Referring also to FIGS. 2 and 3, the present invention provides an improvement in the above two-piece master link in that at least a substantial portion of their juncture line 14, defined by a mating surface 24 of link part 12 and a mating surface 26 of the inner link part 13, is disposed on a diagonal plane between the inner and outer master link surfaces, 27 and 28 respectively. The mating surfaces of the link parts have multiple mating and interlocking serrations 29 to resist and distribute the tensile load exerted on the master link at the bore surfaces 22 and 23 of its parts.

Referring now to FIGS. 1 and 2, the outer link part 12 has a pin bushing connection portion 31 and a thicker central portion 32 which is angularly disposed with relation to the pin bushing connection portion 31 and which defines the mating surface 24. The outer link part 12 also has an outer surface 33, indicated in FIG. 1, which is flat and suitable for receiving the track shoe 18.

Referring to FIGS. 1 and 3, the inner link part 13 has a pin connection portion 34 and a thicker central portion 36 which defines the mating surface 26 at an angular disposition relative to the pin connection portion 34 such that the mating surfaces 24 and 26 of the link parts may be aligned while the pin bushing bore 22 and the pin bore 23 of the link parts are also in parallel alignment. The inner link part 13 also has a small outer surface 37 which aligns and cooperates with the outer surface 33 of the outer link part 12 for receiving and supporting the track shoe 18.

Referring again to FIG. 1, the central portion 32 of the outer link part 12 of the assembled master link 11 defines a plurality of keys 38 with slots 39 interposed therebetween within the serrated portion 29 of the juncture 14. The keys and interposed slots are parallel to the pin bushing connection bore 22 and are further disposed along a diagonal plane through the master link which is defined by an imaginary line on the outer surface 28 of the master link and which is parallel to and adjacent the pin connection bore 23 of the inner link 13 and an imaginary line along the inner surface 27 of the master link which is parallel to and adjacent the pin bushing connection bore 22 of the outer link part 12. The mating surface portion 41 of the outer link part 12 which is disposed between the serrated juncture 29 and the outer link surface 28 varies from the diagonal plane of the serrations to be inclined away from the pin connection bore 23 and to approach the outer link surface 28 in a more perpendicular relation thereto. Similarly, the mating surface portion 42 adjacent the serrated juncture 29 and extending therefrom toward the inner link surface 27 varies from the diagonal plane of the serrations to incline away from the pin bushing bore surface 22 and to approach the inner link surface 27 in a more perpendicular relation thereto. Another mating surface portion 43 of the outer link part 12 is disposed between the mating surface 42 and the inner link surface 27 substantially normal to the inner link surface. The inner link part 13 has keys 44 with slots 46 interposed therebetween to mate and interlock with the keys 38 and the slots 39 of the outer link part 12. Thus the keys 44 and the slots 46 of the inner link part 13 are in similar parallel alignment with bores 22 and 23 as the keys 38 and slots 39 of the outer link part 12 and they are also in the same diagonal plane. The inner link part 13 has a mating surface portion 47 disposed between the serrated surface portion 29 and the outer link surface 28 to mate with the mating surface portion 41 of the outer link part 12. Similarly, the inner link part 13 has surface portions 48 and 49 which mate with the surface portions 42 and 43 respectively of the outer link part 12.

Having reference still to FIG. 1, numerous advantages are readily apparent from the nature of the entire juncture 14 between the link parts. In particular, the multiple mating and interlocking keys and slots of the serrated juncture portion 29 provide multiple contact surfaces 51 which receive the tensile force exerted on the link and distribute that received force through the central portions of both of the link parts. They also coact to provide added resistance to lateral bending of the link. Further, the vertical height of the contacting surfaces 51 represents the vertical separation which is necessary between the link parts to permit the continuous chain of links to be broken. By providing multiple interlocking contact surfaces 51, this vertical distance is substantially reduced thereby facilitating assembly and disassembly of the master link particularly on large vehicles during field repairs. Still further, since the juncture portion represented by mating surfaces 42 and 48 are inclined away from the general diagonal plane and from the pin bushing bore 22 of the outer link part 12, the mass of the outer link part 12 between its surface portion 42 and the pin bushing connection bore 22 is substantially increased thereby reducing the possibility of fracture between the bores and the juncture of the parts. Similarly, since the juncture portion represented by mating surface portions 41 and 47 is inclined out of the diagonal plane away from the pin connection bore 23, an increased mass of the inner link part 13 is provided therebetween to minimize fracture. Additionally, it is to be noted that impact of the track shoe 18 upon the ground or hard surfaces is transmitted into both link parts adjacent the mating surfaces 41 and 47. By disposing these mating surface portions in a more perpendicular relation with the outer link surface 28, the possibility of fracture in the outer link part 12 adjacent its mating surface portion 41 is reduced as well. By reason of the reduced vertical height of the contacting surfaces 51, the present master link further provides an increased continuous mass of the central portions of the outer and inner link parts respectively adjacent the outer link surface 28 and the inner link surface 27 is thereby substantially increased. This increased continuous mass of the central link parts permits substantial improvements in the cap screws 16 and 17. For example, the bores in the link parts for receiving the cap screws may be increased without overly weakening the central portions of the link parts thereby permitting the use of cap screws which are of greater diameter and accordingly of greater strengths. Similarly, the threaded bores 19' and 21' which threadedly receive the cap screws 16 and 17 may have longer threaded portions to reduce thread galling and fatigue and thereby increase the operational life of the link. Also, the obtuse angles of the juncture line between the parts minimizes localized stress and increases operational life.

Still further, the keys and slots of the outer and inner link parts, 38, 39 and 44, 46 respectively, which form the serrated juncture 29, are of inverted symmetrical configuration. By this symmetrical configuration, a substantial reduction in machining time is possible. For example, one of the link parts may be inverted and properly aligned with the other link part whereby the keys and slots of both link parts may be simultaneously formed in a single machine operation.

What is claimed is:

1. A master track link having an outer surface for receiving a track shoe and an opposite inner surface, the link comprising two separable parts with end portions forming a pin connection bore and a pin bushing connection bore respectively, the parts also having central portions together forming a central portion of the link, the parts having mating surfaces forming a juncture therebetween disposed in substantial part along a diagonal plane within the link, said mating surfaces defining multiple mating serations arranged generally parallel with the bores in the parts, the link parts interlocking at their serrated juncture to form a substantially continuous central link mass for resisting tensile forces exerted on the end portions of the link parts, a portion of the mating surfaces which form the diagonally disposed juncture adjacent the bushing connection bore varying from the diagonal plane of the juncture and being inclined away from the bushing connection bore to provide a increased link part mass between the pin bushing connection bore and the juncture of the link parts.

2. The master link of claim 1 where the link is adapted to receive a track shoe along its outer surface, the link part having its central portion substantially between the link juncture and the track shoe being an outer link part and the other link part being an inner link part and wherein the juncture between the link parts intercepts the inner link surface adjacent the pin bushing connection bore defined by one of the link parts and the juncture also intercepts the outer link surface adjacent the pin connection bore defined by the other link part.

3. The master link of claim 2 where the outer link part defines the bushing connection bore and the inner link part defines the pin connection bore and wherein the juncture approaching the outer link surface adjacent the pin connection bore of the inner link part varies from the diagonal plane of the juncture to incline away from the pin connection bore of the inner link part and approach the outer link surface in a more perpendicular relation thereto.

4. The master link of claim 3 wherein the vertical dimension of the serrations of each link part are of minimum dimensions commensurate with providing effective multiple interlocking surfaces between the link parts to provide a substantial mass in the central portion of each link part between their juncture and the inner and outer link surfaces.

References Cited

UNITED STATES PATENTS

| | | | |
|---|---|---|---|
| 1,980,126 | 11/1934 | Williams | 74—248 X |
| 3,020,096 | 2/1962 | Strnad | 305—58 X |
| 3,096,661 | 7/1963 | Reinsma | 305—39 X |
| 3,357,750 | 12/1967 | Reynolds | 305—54 |

RICHARD J. JOHNSON, *Primary Examiner.*

U.S. Cl. X.R.

74—249